(12) United States Patent
Machek (10) Patent No.: US 6,772,524 B2
(45) Date of Patent: Aug. 10, 2004

(54) CHASSIS ALIGNMENT SYSTEM

(75) Inventor: Paul Machek, Osborne Park (AU)

(73) Assignee: Tepra Pty Ltd, Osborne Park (AU)

( * ) Notice: Subject to any disclaimer, the term of this patent is extended or adjusted under 35 U.S.C. 154(b) by 0 days.

(21) Appl. No.: 10/243,491

(22) Filed: Sep. 13, 2002

(65) Prior Publication Data

US 2003/0154609 A1 Aug. 21, 2003

(30) Foreign Application Priority Data

Feb. 15, 2002 (AU) .............................. PS0574
Jun. 21, 2002 (AU) .............................. PS3122

(51) Int. Cl.$^7$ .......................................... G01B 11/275
(52) U.S. Cl. ............................ 33/203.18; 33/DIG. 21
(58) Field of Search ........................... 33/203.18, 286, 33/288, 203.19, DIG. 21, 203, 293, 203.2, 203.21; 356/139.09, 155

(56) References Cited

U.S. PATENT DOCUMENTS

| | | | | |
|---|---|---|---|---|
| 3,029,515 A | * | 4/1962 | Marteil ........................ | 33/288 |
| 3,164,910 A | * | 1/1965 | Manlove .................. | 33/203.18 |
| 3,445,936 A | * | 5/1969 | Wilkerson .................... | 33/288 |
| 3,869,798 A | * | 3/1975 | Wilkerson .................... | 33/264 |
| 4,115,926 A | * | 9/1978 | Hampton et al. ............. | 33/288 |
| 4,338,027 A | * | 7/1982 | Eck ............................. | 356/155 |
| 4,432,145 A | * | 2/1984 | Caroff ......................... | 33/288 |
| 4,827,623 A | * | 5/1989 | Goodell ....................... | 33/288 |
| 4,854,702 A | * | 8/1989 | Stieff ......................... | 356/155 |
| 5,168,632 A | * | 12/1992 | Rimlinger, Jr. .............. | 33/288 |
| 5,489,983 A | * | 2/1996 | McClenahan et al. . | 356/139.09 |
| 5,505,000 A | * | 4/1996 | Cooke ......................... | 33/286 |
| 5,886,782 A | * | 3/1999 | Hedgecock, Jr. ............ | 356/155 |

* cited by examiner

Primary Examiner—Christopher W. Fulton
Assistant Examiner—R. Alexander Smith
(74) Attorney, Agent, or Firm—Jeffrey M. Kaden; Gottlieb, Rackman & Reisman, P.C.

(57) ABSTRACT

A chassis alignment system for a vehicle having steerable stub-axles comprises a pair of alignment tools. Each alignment tool comprises a rigid, unitary housing having a mounting receivable directly on the respective stub-axle and supporting the housing from the stub-axle in a fixed attitude with respect to the central axis of the respective stub-axle, the housing being adjustable in position around the stub-axle. Each housing accommodates a laser emitter which emits a beam parallel to the central axis of the respective stub axle, and further comprises a graduated target positioned to receive the beam from the laser emitter of the other alignment tool. Each target has a reference point positioned relative to the respective central axis, wherein the point of incidence of each beam on the respective target relative to the reference point enables the relative orientation of the stub-axles to be determined.

26 Claims, 11 Drawing Sheets

CHASSIS ALIGNMENT SYSTEM

FIELD OF THE INVENTION

The present invention relates to a device and method for alignment of the chassis of a wheeled vehicle. It has particular application in relation to the alignment of the chassis of go-karts and will be described in relation to that application. However, it should be understood that the invention may readily be adapted for use on many other wheeled vehicles.

BACKGROUND ART

The proper alignment of the chassis and the mounting of wheels thereto is an important element in the handling of any wheeled vehicle. A particularly important aspect of this chassis alignment is the alignment of the wheels which steer the vehicle which are usually the front wheels. While wheel alignment equipment for passenger vehicles such as conventional motor cars and commercial vehicles such as trucks are well known; they usually comprise very expensive installations which are permanently installed within a workshop. However the alignment of the steering wheels of a go-kart present factors which make such devices inapplicable. Go-karts are primarily used as competition vehicles where performance is the most important criteria. To obtain the ultimate performance from a particular go-kart, the set-up of the steering and chassis must be adjusted to suit each particular racetrack. Adjustments are required on race day and sometimes during the race itself. At the same time go-karts are intended as a relatively inexpensive form of motor racing such that the average competitor cannot afford very expensive equipment. Because of these reasons, methods for chassis alignment of go-karts have been limited to rather simple techniques and equipment. As the sport of go-kart racing has developed, the traditional methods have been found to be of insufficient accuracy for setting up a go-kart for racing.

DISCLOSURE OF THE INVENTION

Accordingly, the invention resides in a chassis alignment system comprising an alignment tool associated with a target, the alignment tool comprising a housing accommodating a laser emitting means, the housing having a mounting means adapted to enable the tool to be fixed to a first steerable axle and to be movable therewith, the laser emitting means being disposed in the housing at a predetermined distance from the mounting means, the mounting means being further adapted to enable the laser emitting means to be oriented about the central axis of the first steerable axle into a selected orientation, the laser beam being adapted to be emitted in a direction parallel to the central axis, the target comprising means to receive the first laser beam and provide an indication of the position at which the first laser beam is incident upon the target relative to a reference, the target adapted to be positioned relative to the vehicle to enable the orientation of the first steerable axle relative to an opposed, second steerable axle to be ascertained.

According to a preferred feature of the invention, the target is adapted to be fixed to the opposed, second steerable axle and to be movable therewith, the reference of the toe-in/camber target being spaced and oriented from the second steerable axle in a manner corresponding with the spacing and orientation of the laser emitting means from the first steerable axle.

According to a preferred feature of the invention, the target comprises indicia marked relative to a reference point.

According to a preferred embodiment, the mounting means comprises a clamp integral with the housing.

According to a preferred embodiment, the mounting means comprises an aperture integral with the housing, the aperture adapted to be received by the steerable axle to be secured thereto.

According to a preferred feature of the invention, the alignment tool further comprises an orienting means adapted to enable the alignment tool to be oriented to a datum. According to a preferred embodiment, the orienting means comprises a spirit level associated with the housing to provide a reference for orienting the housing.

According to a preferred feature of the invention, the target comprises a second alignment tool, the second tool being of the same type as the first alignment tool.

According to a preferred feature of the invention, the alignment tool further comprises a further laser emitting means, the further laser emitting means being adapted to emit a further laser beam in a direction substantially transverse to that of the first laser beam.

According to a preferred feature of the invention, the alignment tool is associated with a king-pin target adapted to intercept the beam from the further laser emitting device, the king-pin target comprising a reference point, an indication relative to a datum and a angular gauge indicating angular displacement from said indication about said reference point. According to a preferred embodiment, the reference point, indication and angular gauge are provided on a planar face. According to a preferred embodiment, the king-pin target is adapted to be mounted to a rear axle of the vehicle, the indication being parallel to the axis of said rear axle when mounted thereto.

According to a further aspect, the invention resides in a method of measuring the toe-in angle of the steering geometry of a vehicle, the method comprising the steps of mounting relative to each of steerable axles of the vehicle an alignment tool of the type as previously described, co-aligning the alignment tools relative to each other, and positioning the steering so that the horizontal position of each beam on the opposed respective target corresponds with the horizontal position of the opposed beam on its respective target.

According to a further aspect, the invention resides in a method of measuring the camber angle of the steering geometry of a vehicle, the method comprising the steps of mounting relative to each of steerable axles of the vehicle an alignment tool of the type as previously described, co-aligning the alignment tools relative to each other, and positioning the steering so that the vertical position of each beam on the opposed respective target corresponds with the vertical position of the opposed beam on its respective target.

According to a further aspect, a castor gauge is associated with a pair of alignment tools, the castor gauge being adapted to indicate the castor angle by use of the alignment tools. According to a preferred feature of the invention, the castor gauge comprises a reference point, an indication relative to a reference plane and a angular gauge indicating angular displacement from said indication about said reference point. According to a preferred embodiment, the castor gauge comprises a pair of parallel faces wherein the reference point is positioned on at least one face. According to a preferred embodiment, the material between the pair of parallel faces is substantially transparent or translucent.

According to a further aspect, there is disclosed a method of orienting the steering of a vehicle in a straight-ahead direction, the method comprising the steps of mounting relative to each of the steerable axles of the vehicle an alignment tool of the type as previously described, co-aligning the alignment tools relative to each other, positioning a target at an equal distance between each of the alignment tools, the target comprising a pair of parallel faces having a reference point referable to each face, and positioning the target so that the beam from each alignment tool is incident upon a respective face at the position referable to said reference point, each beam being incident upon the respective face substantially normal to that face.

According to a further aspect, the invention resides in a method of measuring the castor angle of the steering geometry of a vehicle, the method comprising the steps of mounting a pair of alignment tools as previously described relative to each of the steerable axles of the vehicle, co-aligning the alignment tools relative to each other, positioning the steering to a straight-ahead direction, positioning a castor gauge mid-way between the two alignment tools, the castor gauge comprising a reference point, an indication relative to a reference plane and a angular gauge indicating angular displacement from said indication about said reference point, orienting the castor gauge to align the indication parallel to a datum, and thereafter moving the steering to cause the beam from one alignment tool to be moved away from the reference towards the angular gauge to enable the angular displacement of the beam from the indication to be observed.

According to a preferred feature of the invention, the datum is adjusted to a horizontal reference and the orientation reference of the castor gauge is made relative to a horizontal reference plane. According to a preferred embodiment horizontal reference plane is ascertained by reference to a vertical reference.

According to a further aspect, the invention resides in a method of indicating the king-pin inclination angle of the steering geometry of a vehicle, the method comprising the steps of mounting an alignment tool as previously described relative to a respective steerable axle of the vehicle with the further beam directed rearwardly, positioning the steering to a straight-ahead direction, positioning a target to intercept the beam from the further laser emitting means, the target comprising a reference point, an indication relative to a datum and a angular gauge indicating angular displacement from said indication about said reference point aligning the target relative to the alignment tool so that the beam strikes a reference point on the target, and moving the steering to displace the beam to a position on the target such that the angular displacement of the further beam from the indication about the reference point provides an indication of the king-pin inclination angle.

According to a further aspect, the invention resides in a chassis alignment tool comprising a housing accommodating a laser emitting means, the housing having a mounting means adapted to enable the tool to be fixed to a first steerable axle of a vehicle and to be movable therewith, the first steerable axle having a central axis, the laser emitting means being disposed in the housing at a predetermined distance from the mounting means and adapted, in use, to emit a beam in a direction parallel to the central axis, the mounting means being further adapted to enable the laser emitting means to be oriented about the central axis into a selected orientation.

The invention will be more fully understood in the light of the following description of two specific embodiments.

BRIEF DESCRIPTION OF THE DRAWINGS

The description is made with reference to the accompanying drawings of which:

FIG. 9b is an end view of the embodiment of the castor gauge as shown in FIG. 9a;

FIG. 9c is a plan view of the embodiment of the castor gauge as shown in FIG. 9a;

FIG. 9d is a side elevation of the embodiment of the castor gauge as shown in FIG. 9a;

FIG. 11b is a plan view of the embodiment of a target block as shown in FIG. 11a;

FIG. 11c is an end view of the embodiment of a target block as shown in FIG. 11a;

FIG. 11d is a rear elevation of the embodiment of a target block as shown in FIG. 11a;

DETAILED DESCRIPTION OF PREFERRED EMBODIMENTS

The embodiments of the invention are directed to a chassis alignment tool for a go-kart which enables the alignment of the chassis to be accurately measured.

A first embodiment of a chassis alignment tool according to the present invention is shown in FIGS. 1 to 5. The tool 11 comprises a housing 12 of substantially elongate cuboid construction having a front face 13, a rear face 14, a first side face 15, an opposed second side face 16, an upper end 17 and an opposed lower end 18. As shown in the drawings, the two side faces 15 and 16 are of curved profile to improve the aesthetics of the tool.

The tool is designed especially for use with a go-kart of the type which uses adjustable hubs to support the front wheels. Such hubs are in the form of an elongate tube which are lockingly positioned on the front stub axles of the go-kart and conventionally incorporate an integral brake disc. The wheel bearing is received over the tube and locked in place by the wheel nut. While the tool will be described in relation to this application, it may also be adapted to the older design of go-karts wherein the wheel bearing rides directly on the stub axle, as will be described later in this description.

The housing 12 is adapted to be positioned over the tube of the hub of a go-kart by engagement with a first circular aperture 21 provided adjacent to the lower end 18 of the housing. The first aperture 21 extends fully through the housing 12 from the front face 13 to the rear face 14. The diameter of the first aperture 21 closely corresponds with the diameter of the hub to which the housing is to be positioned and which constitutes a substantial portion of the width of the front face 13. A chamfer 22 is provided at the edge between the first aperture 21 and the front face 13.

The housing 12 is adapted to be clamped to the hub by clamping means by virtue of a first slot 23 extending from the lower end 18 of the housing through to the first aperture 21. The first slot 23 is radially directed relative to the first aperture 21 and is axially aligned therewith thereby providing the lower portion of the housing with two arms when viewed from the front or rear face, a first arm 24 extending from the first side 15 and a second arm 25 extending from the second side 16 of the housing 12. A clamping screw 26 is located in a second aperture 27 which extends from the first side 15 within the first arm 24 between the first aperture 21 and the lower end 18 of the housing 12 to the slot 23. The second aperture 27 continues in the second arm 25 and is threaded in this portion. In use, by tightening the clamping screw 26, the two arms are urged together about the slot 23 thereby clampingly engaging the housing 12 securely onto the hub.

The housing 12 is provided with an orienting means adapted to enable the user to orient the housing 12 such that it may be positioned to extend substantially vertically upwards from the stub axle. The orienting means comprises a spirit level 31 visible through a viewing slot 32 in the upper end 17 of the housing 12, the spirit level 31 being oriented transversely to the axis of the first aperture 21. The spirit level 31 is in conventional form of a sealed, arced tube substantially filled with fluid such that a bubble of gas is visible within it. As is well known, when the tube is horizontal the bubble will sit mid way between the ends of the tube. The sealed tube is mounted in the housing in a third aperture 33 extending from the first side 15 and closely adjacent to the upper end 17. The viewing slot 32 is provided in the upper end 17 to open into the third aperture 33 and thereby enable the viewing of the spirit level 31.

The housing 12 is further provided with an industrial laser device 41 which is supplied in a cylindrical body 42 whereby, in use, a laser beam is emitted axially from a one end 43 of the body while leads 45 to supply the power to the device extend from an opposed other end 44 of the body 42. The laser device 41 is mounted into a fourth aperture 46 in the housing 12 which extends from the rear face 14 into the housing 12 to a depth necessary to enclose the laser device 41. The axis of the fourth aperture 46 is parallel to the axis of the first aperture 12 and centrally located in the housing 12 disposed from the upper end 17 by distance approximately equal to half of the width of the front face 13. A fifth aperture 47 of small diameter compared with the fourth aperture 46, extends from the fourth aperture through to the front face 13. The fifth aperture 47 is co-axial with the fourth aperture 46 to enable the laser beam to be emitted normally by the laser device 41 from the front face 13.

The laser device is retained within the fourth aperture 46 by a set of three counter-sink headed retaining screws 48 screwed into holes in the housing oriented about the fourth aperture 46. The head of each screw bears onto the edge of the other end of the body of the laser device. By tightening one of the screws to a slightly greater degree, the alignment of the laser beam may be adjusted to a very high tolerance.

Electrical power is supplied to the laser device from an external source through an electrical socket 51 mounted on the first side 15 of the housing 12. In an alternative adaptation of the first embodiment, the housing is provided with an enclosure to hold a battery to provide the electrical power, a switch being mounted on a side face.

On the front face 13 of the housing 12 and centrally disposed about the fifth aperture 47 there is marked a square grid pattern 52. The grid markings are formed by grooves machined into the front face 13 parallel to and perpendicular to the sides of the front face 13. The grid 52 extends the full width of the front face 13 and from the upper end 17 for a distance equivalent to the width of the front face 13.

Because of the narrow tolerances for the machining of critical dimensions of the tool as well as the need for durability, the housing 12 is preferably made from a material that is dimensionally stable and tough. A metal such as aluminium, is reasonably suitable for this. However, it has been found that metals can be unforgiving in the event that the spigot or shaft to which the tool is mounted is damaged slightly, with the result that the tool may "grab" the spigot or shaft. It has been found that manufacturing the tool from a plastics material such as anacetyl homo-polymer provides a tool that is better adapted to cope with such damage or other abnormalities. Because of these properties, it has been found possible to provide the tool manufactured from such a material to a higher tolerance than is possible by use of metal.

Wheel alignment tools as described above are supplied as matched pairs. Prior to initial use, the laser beam of each device is aligned relative to its pair by the being mounted onto a jig. While the laser beams are turned on, the mounting of each laser device is adjusted by the retaining screws 48 to the correct orientation.

Figure 8:
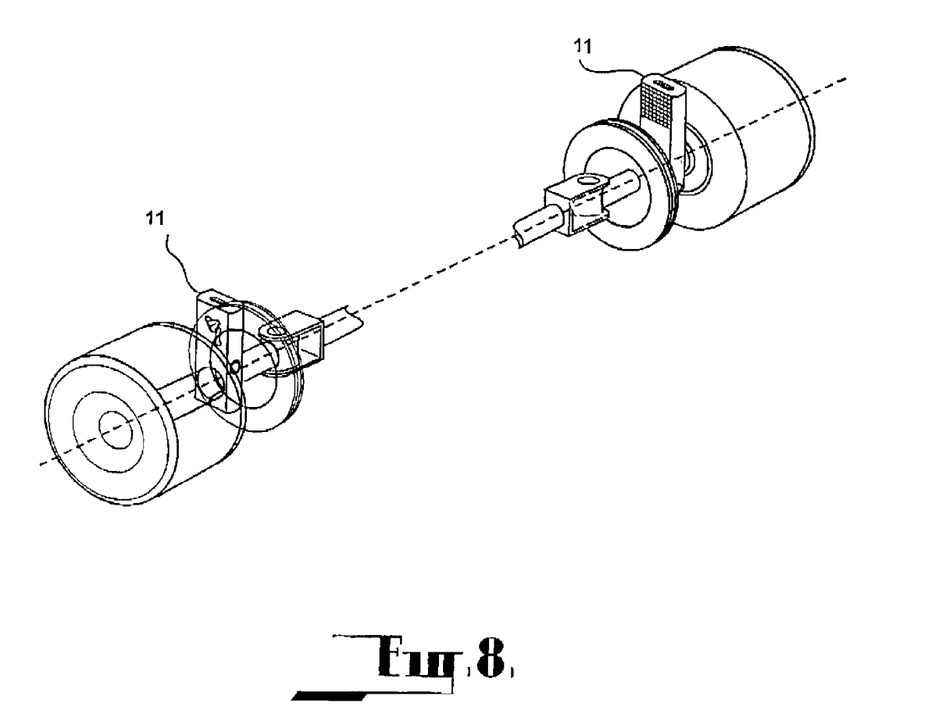
FIG. 8 is an isometric view showing the steering arrangement of a go-kart to which a pair of chassis alignment tools in accordance with the third embodiment has been mounted.

When the alignment tool is used, the go-kart is first positioned in a horizontal attitude and the steering positioned in the straight-ahead direction. The steering (front) wheels are removed and an alignment tool is positioned on the hub of each stub axle, as depicted in FIG. 8. Preferably the wheels are replaced onto the stub axles.

Each alignment tool 11 is oriented into a vertical orientation by rotating each tool 11 about the respective stub axle until the bubble in its spirit level 31 is appropriately positioned. In this way the tools are able to be aligned to each other by a very straightforward method within a tolerance which is quite satisfactory for the tasks to be performed. The tool is then clamped to the stub axle by tightening the clamping screw 26. Power is applied to each laser device 41 whereby the laser beam is directed at the corresponding alignment tool on the opposed stub axle. By virtue of its elongate construction whereby the fifth aperture is disposed from the first aperture 21, the laser beam is able to avoid the brake discs which would otherwise be in the way of the beams. Thus, the beam of one alignment tool can strike the front face of the other alignment tool, where it is seen as a red dot reflected from the front face of the other alignment tool. Because of the pre-alignment of the beam of each device, the dot appears on the grid marked on the alignment tool in a position which represents the relative alignment of the steering. The steering alignment may then be adjusted in the normal manner, the dot on each tool being moved about the grid to identify the relative alignment. It will be seen by those skilled in the art that movement of the dot across the grid in a horizontal plane identifies adjustment of the toe-in/toe-out of the vehicle while movement of dot in a vertical plane identifies adjustment of camber angle.

By means of the device according to this first embodiment, the steering of a go-kart may be adjusted with a degree of accuracy and consistency which far exceeds previously known devices. At the same time, the apparatus may be used easily and quickly so that race day adjustments may readily be made. As well, the device may be used while the go-kart is placed on the ground rather than being positioned on a stand and indeed even while the driver is seated in the go-kart. This is important because significant variations in the wheel alignment are observed under these alternative conditions.

It is also possible to align the steering using a single chassis alignment tool of the first embodiment. In such a case, the second tool is replaced by a simple target. adapted to receive the beam from the chassis alignment tool mounted on the first steerable axle and adapted to be fixed to the second steerable axle, whereby in use the target is movable with the second steerable axle. The target is spaced and oriented from the second axle in a manner corresponding with the spacing and orientation of the laser emitting means from the first steerable axle so that adjustment of the alignment of the first steerable axle relative to the second steerable axle causes the point of incidence of the laser beam on the target to be varied. With this arrangement, one of the wheels is aligned first and then the chassis alignment tool must be removed from the first axle and the target removed from the second axle, and then each is replaced on the respective opposite axle, oriented properly and the alignment of the second axle undertaken. While such an arrangement is will provide alignment accuracy which is the same as that obtained by using two integrated tools, it will readily be observed that the saving in not having a duplicate tool is more than offset by the additional time and inconvenience that results. The use of a pair of tools saves considerable time which is a most important factor on race day.

In an alternative arrangement for use of a single tool, a target is positioned at a predetermined place with respect to the chassis. Such a target may be permanently positioned or may be removable from a designated position. Optionally a separate target may be used for each wheel or alternatively, a single, centrally positioned target may receive a beam from either steerable wheel. While such arrangements could be utilised quickly, the accuracy could easily be compromised by an accident which distorts the chassis.

The second embodiment of a chassis alignment tool according to the present invention is shown in FIGS. 12a to 12h. The tool 111 comprises a housing 112 of substantially squat cylindrical construction having a front face 113, a rear face 114 enclosed by a cover 115, an upper end 117 and an opposed lower end 118.

The tool is designed especially for use with a go-kart of the older type which does not use adjustable hubs to support the front wheels, but rather directly supports the bearing of the wheel by the stub-axle. The wheel bearing is received over the stub axle and locked in place by a clamping nut threadably engaging the outer end of the stub-axle.

The housing 112 is adapted to be positioned over the stub-axle of a go-kart by engagement with a first circular aperture 121 provided adjacent to the lower end 118 of the housing. The first aperture 121 extends fully through the housing 112 from the front face 113 to the rear face 114. The diameter of the first aperture 121 closely corresponds with the diameter of the stub-axle to which the housing is to be positioned.

The housing 112 is adapted to be clamped to the stub-axle by tightening the stub-axle nut.

The housing 112 is provided with an orienting means adapted to enable the user to orient the housing 112 such that it may be positioned to extend substantially vertically upwards from the stub axle. The orienting means comprises a spirit level 131 mounted in a slot 132 in the upper end 117 of the housing 112, the spirit level 131 being oriented transversely to the axis of the first aperture 121. The spirit level 131 is in conventional form of a sealed, arced tube substantially filled with fluid such that a bubble of gas is visible within it. The spirit level 131 is retained within the slot 132 by any convenient means.

The housing 112 is further provided with an industrial laser device 41 which is of the same type as that used in the first embodiment. The laser device 41 is mounted into a second aperture 146 in the housing 112 which extends from the rear face 114 into the housing 112 to a depth necessary to enclose the laser device 41. The axis of the second aperture 146 is parallel to the axis of the first aperture 112 and located in the housing 112 disposed in the upper portion of the housing 112. A third aperture 147 of small diameter compared with the second aperture 146, extends from the second aperture through to the front face 113. The third aperture 147 is co-axial with the second aperture 146 to enable the laser beam to be emitted normally by the laser device 41 from the front face 113.

The laser device is retained within the second aperture 146 by a set of three counter-sink headed retaining screws screwed into holes in the housing oriented about the second aperture 146 in a manner similar to that of the first embodiment.

Electrical power is supplied to the laser device 41 from a battery received within a space 152 in the housing accessible from the rear of the housing. The space 152 is sized to receive a conventional dry-cell cell or battery. A switching device 153 is mounted within a fourth aperture 154 extending from the front face 113 to the rear face 114, the fourth aperture abutting the space 152. Electrical wiring is provided between the battery and the switching device 153 and the switching device 153 and the laser device 41 via a channel 155 in the housing 112.

On the front face 113 of the housing 112 and centrally disposed about the third aperture 147 there is marked a square grid pattern 152. The grid markings are formed by grooves machined into the front face 113 parallel to and perpendicular to the elongate axis of the spirit level 131.

Again, because of the narrow tolerances for the machining of critical dimensions of the tool as well as the need for durability, the housing 112 is preferably made from metal such as aluminium, although other materials maybe used.

Figure 1:
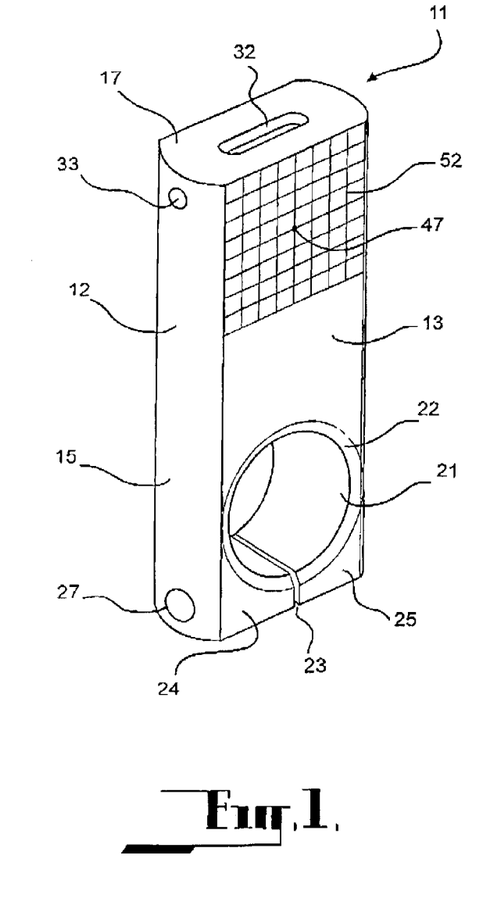
FIG. 1 is an isometric view of a chassis alignment tool in accordance with the first embodiment, the view showing the front face of the tool.
Figure 2:
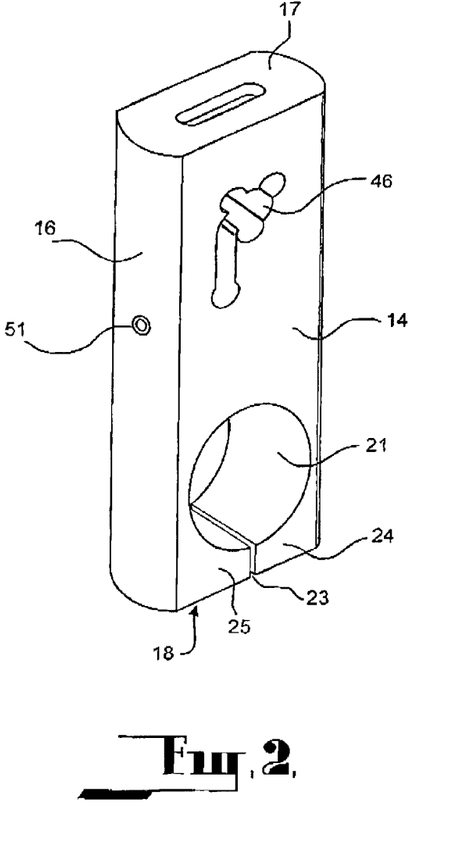
FIG. 2 is an alternative isometric view of a chassis alignment tool in accordance with the first embodiment, the view showing the rear face of the tool.
Figure 3:
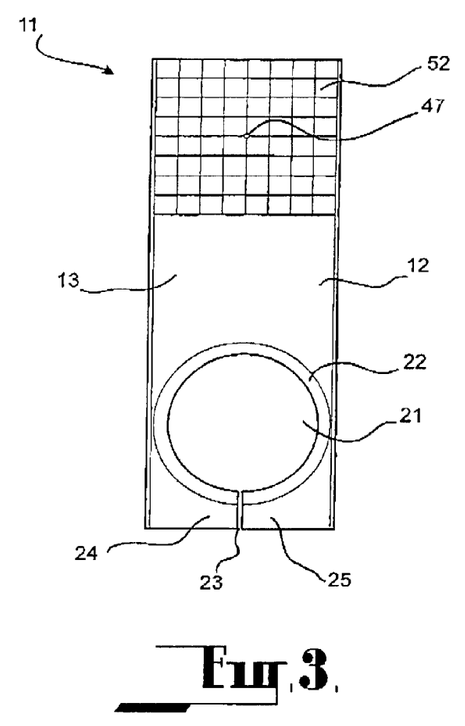
FIG. 3 is a front elevation of a chassis alignment tool in accordance with the first embodiment.
Figure 4:
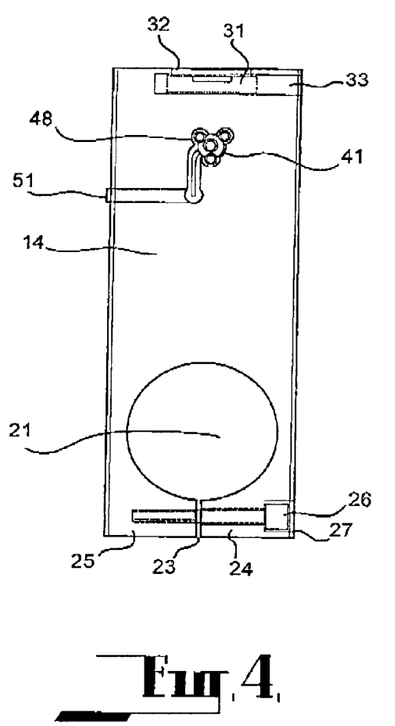
FIG. 4 is a rear elevation of a chassis alignment tool in accordance with the first embodiment.
Figure 5:
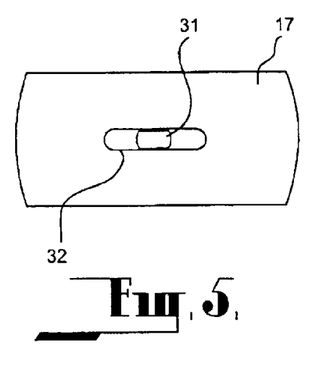
FIG. 5 is a plan view of a chassis alignment tool in accordance with the first embodiment.
Figure 6:
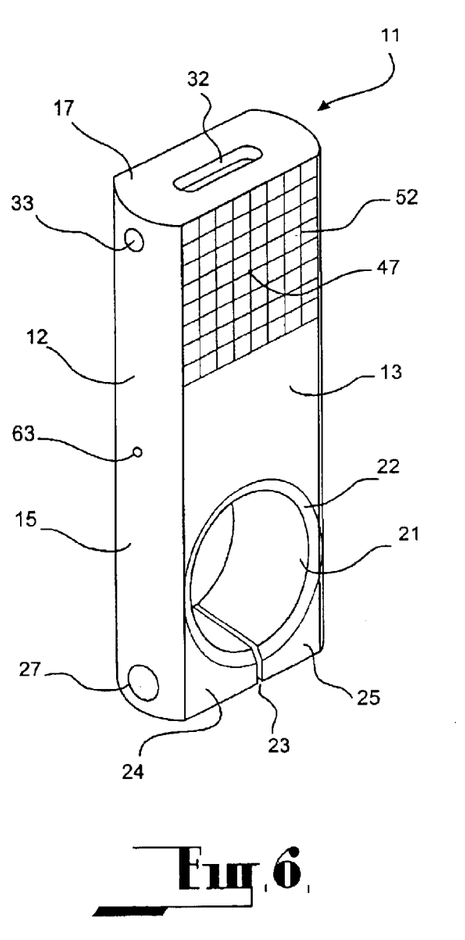
FIG. 6 is an isometric view of a chassis alignment tool in accordance with the third embodiment, the view showing the front face of the tool.
Figure 7:
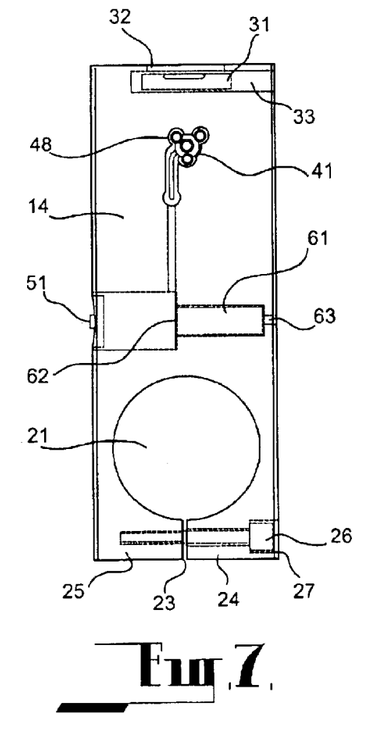
FIG. 7 is a rear elevation of a chassis alignment tool in accordance with the third embodiment.

The third embodiment of a chassis alignment tool is illustrated in FIGS. 6 and 7. The third embodiment generally incorporates the features of the first embodiment and in the drawings like features are depicted with the same numerals.

In addition to the features as described in relation to the first embodiment, the third embodiment further incorporates a second laser device 61. The second laser device 61 is of similar type to that of the first laser device 41 as described in relation to the first embodiment.

The second laser device 61 is mounted into a sixth aperture 62 in the housing which extends from a side face (either 15 or 16) into the housing 12 intermediate the first aperture 21 and the fourth aperture 46. The chassis alignment tools of the third embodiment are again designed to be supplied as a matched pair, wherein in one of the pair, the sixth aperture 62 extends from the first side face 15 while in the second tool of the pair, the sixth aperture 62 extends from second side face 16. In the drawings, the sixth aperture 62 is shown extending from the second side face, only.

The axis of the second laser device 61 extends transversely to the axis of the first laser device 41. A seventh aperture 63 of small diameter and co-axial with the sixth aperture 62 extends from the base of the sixth aperture 62 to the opposed side face to enable the beam of the second laser to be emitted from that side face. In use, when installed on the front stub axle, the second laser beam is directed to the rear of the go-kart.

The second laser device 61 is also retained by a set of three retaining screws to enable fine adjustment of the orientation of the second laser beam prior to shipment from the factory. It receives electrical power from the same source as the first laser device 41.

The wheel alignment tool of the third embodiment is applied to the go-kart in the same manner as described in relation to the first embodiment and can be used to align the front wheels in the same way.

The beams directed to the rear of the go-kart may be utilized in a number of ways because the beams provided a precise relative position reference at the rear with respect to the front suspension. Uniquely to the manner of operation of the present invention, this reference at the rear is directly related to the steering axis as its primary reference. This enables an unprecedented level of accuracy in the alignment and set up of chassis and suspension of the go-kart.

Firstly, it is common to vary the position along the rear axle at which each of the rear hubs is positioned for each race track and other parameters. In this case, the adjustment can be made relative to the respective beam by applying a suitable marker to the axle and positioning it relative to the beam. The hub may then be positioned relative to the marker. Alternatively, the alignment tool may be rotated sufficiently so that the rearwardly directed beam strikes the rear axle. The hub may then be positioned relative to the point where the beam strikes the axle. This may save time on race day.

Secondly, it is well known that the chassis of a go-kart flexes considerably during racing and that, while the frame is intended to be resilient, in the event of an unintended impact, it is possible for frame to be distorted permanently. While such distortions may not be noticeable to the naked eye, they can adversely affect the vehicle handling to a significant degree. The alignment tool of the third embodiment enables the alignment of the chassis to be checked relative to the steering axis with an ease and accuracy that has not been available previously without very complex equipment.

As mentioned earlier, the tool according to either of the first or third embodiments described above may be adapted for use on go-karts of older design wherein the wheel bearing rides directly on the stub axle. In this application, the diameter of the stub axle is considerably smaller than the diameter of the first aperture 21. For this use, there is provided a reducing bush having an outside diameter corresponding with the diameter of the first aperture. The bush is adapted to be inserted within the first aperture and clampingly retained therein. The bush is provided with an inner bore having a diameter corresponding to the diameter of the stub axle. In this application, the tool is clamped in its oriented position by replacing the wheel onto the stub axle and tightening the wheel locking nut so that the inner side of the wheel bearing bears upon the tool. Thus the tool is adapted for use on most go-karts presently in use.

By use of any of the above described embodiments, together with a suitable angular measuring gauge as described below, it is also possible to measure the castor angle.

FIGS. 9a to 9e shows a castor gauge comprising an aspect of an embodiment wherein the castor gauge is adapted to be associated with a pair of alignment tools as described in respect of either of the first or third embodiments. The castor gauge 71 comprises a length of aluminium extrusion having a rectangular, elongate base plate 72 and a rectangular gauge plate 73 disposed perpendicularly to the base plate 72 midway its width. On each side of the gauge plate 73 there is provided a gauge comprising a reference point 74, a reference line 75 and angular graduations 76 showing the angle from the reference line.

Figure 10:
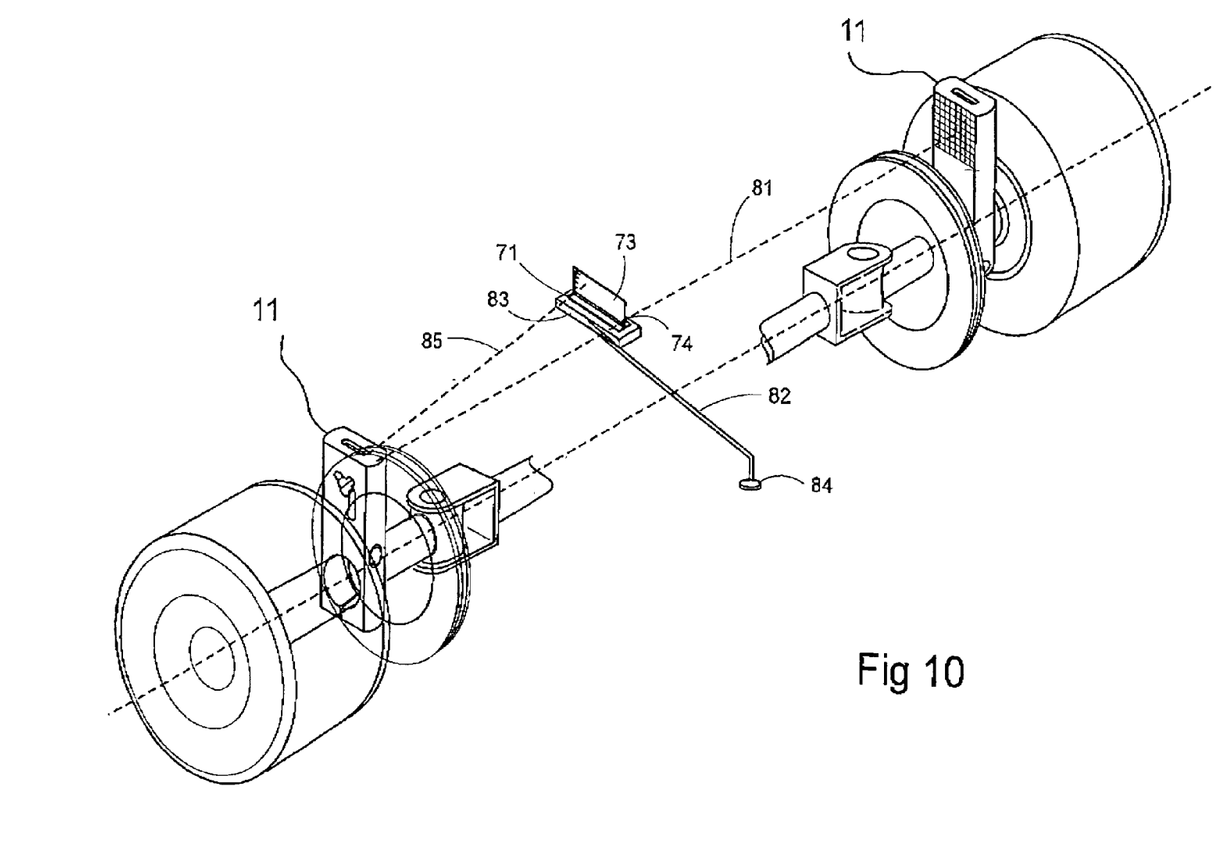
FIG. 10 is an isometric view showing the steering arrangement of a go-kart as shown in FIG. 8 and also showing the positioning of a castor gauge.

As shown in FIG. 10, in order to correctly measure the castor angle, it is necessary to orient the gauge plate 74 so that the plane of the gauge plate 73 is substantially perpendicular to the beam 81 emanating from the alignment tool 11 parallel with the axis of the front axle. A method of positioning the castor gauge 71 in this way requires that the vehicle first be positioned in a horizontal orientation. This may be set by suitable means such as the application of a spirit level to a reference plane provided on the vehicle. Thereafter, the castor gauge 71 is placed on an adjustable mount 82 extending from the vehicle. The adjustable mount 82 is removably attached to the vehicle by means of a magnetic foot 84. The adjustable mount 82 includes a mounting plane 83 which is also adjusted with the aid of a spirit level so that it is oriented substantially horizontally. The castor gauge 71 is positioned with the base plate 72 seated on the mounting plane 83 of the adjustable mount 82 intermediate the alignment tools 11. It may be realized that the opposed beams from the pair of alignment tools will intersect substantially midway between alignment tools when the steering is positioned in the straight-ahead direction. The castor gauge 71 is positioned so that beams strike the reference points 74 marked on the opposed sides of the gauge plate 73. While the gauge plate 73 of the castor gauge should also be aligned so that it is parallel to the fore-aft direction this may be set up by eye with sufficient accuracy for the purpose.

If the steering is now moved in a first direction, the beam 81 on one side of the gauge plate will be moved towards the angular graduations as indicated in FIG. 10 by beam 85. An example of this is indicated by the dot 77 in FIG. 9d. The angle relative to the reference line 75 thus indicated identifies the castor angle. By moving the steering in a second direction opposed to that of the first direction, the beam from the opposed alignment tool may be directed to the graduations on the opposed side of the gauge plate 73. Any discrepancy between the readings is cause for the user to further investigate the alignment of the steering.

Those skilled in the art will recognize that the measurement indicated by the method described above will identify the castor angle accurately only if the camber angle and tow-in are set to zero. Where these settings are not zero, some deviation from the true castor angle will be observed. In order to compensate, the user may establish relative settings shown by the castor gauge to be used for a range of likely camber and tow-in settings which might be used on the vehicle.

Figure 9A:
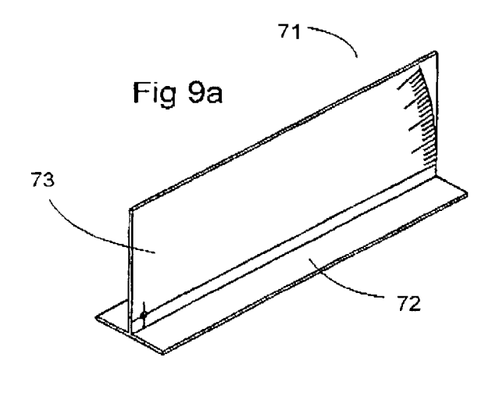
FIG. 9a is an isometric view of an embodiment of a castor gauge for use in conjunction with a chassis alignment tool according to the invention.
Figure 9B:
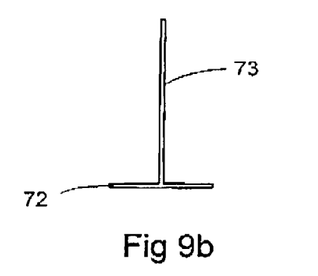
Figure 9C:
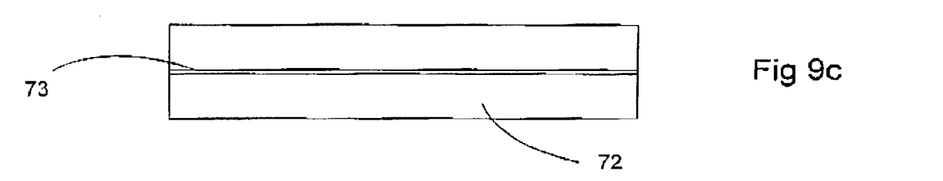
Figure 9D:
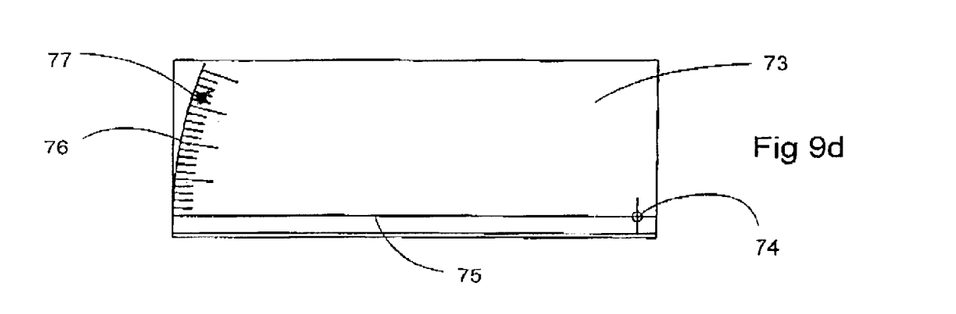
Figure 9E:
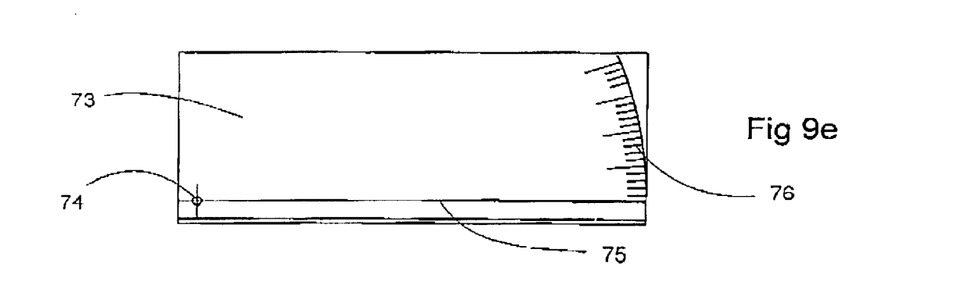
FIG. 9e is an elevation of the opposed side of the embodiment of the castor gauge as shown in FIG. 9.

An adaptation of the castor gauge 71 provides a gauge plate made of transparent or translucent material such as glass or certain plastics. In a device according to this adaptation, the reference point 74, reference line 75 and graduations 76 would be printed or etched directly onto the surface of the gauge plate. With this device, it would be easier to position the castor gauge at the point where the two beams cross as a dot from each beam will be seem simultaneously.

Figure 11A:
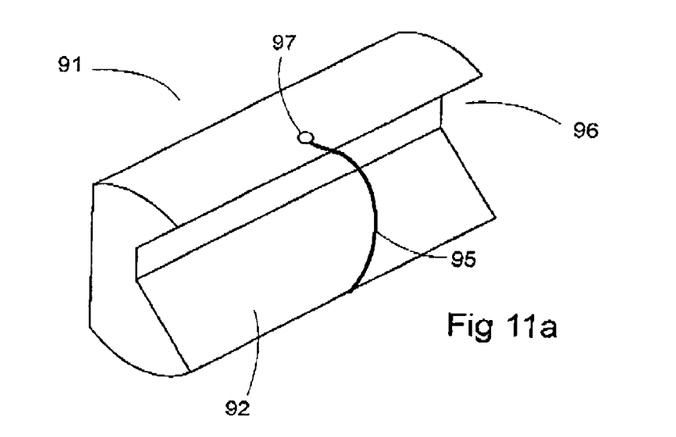
FIG. 11a is an isometric view of an embodiment of a target block for use in conjunction with a chassis alignment tool according to the second embodiment.
Figure 11B:
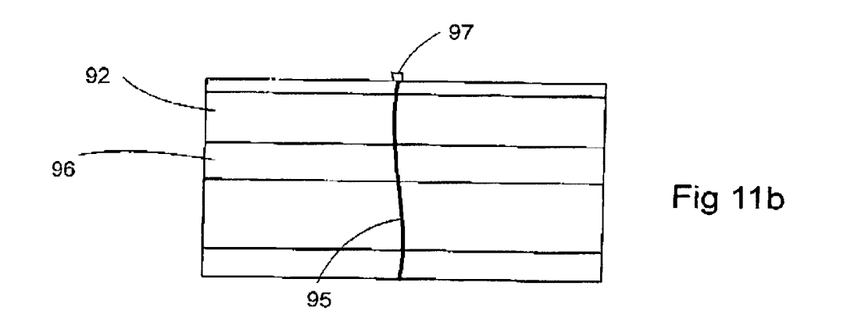
Figure 11C:
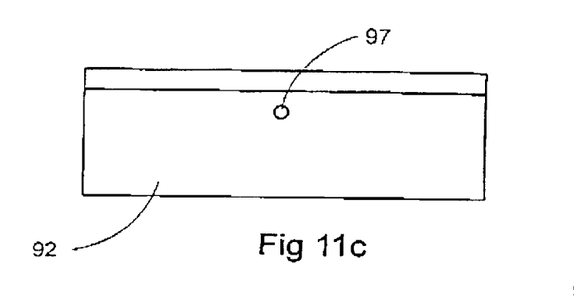
Figure 11D:
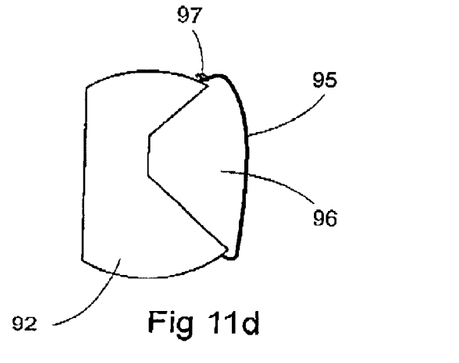
Figure 11E:
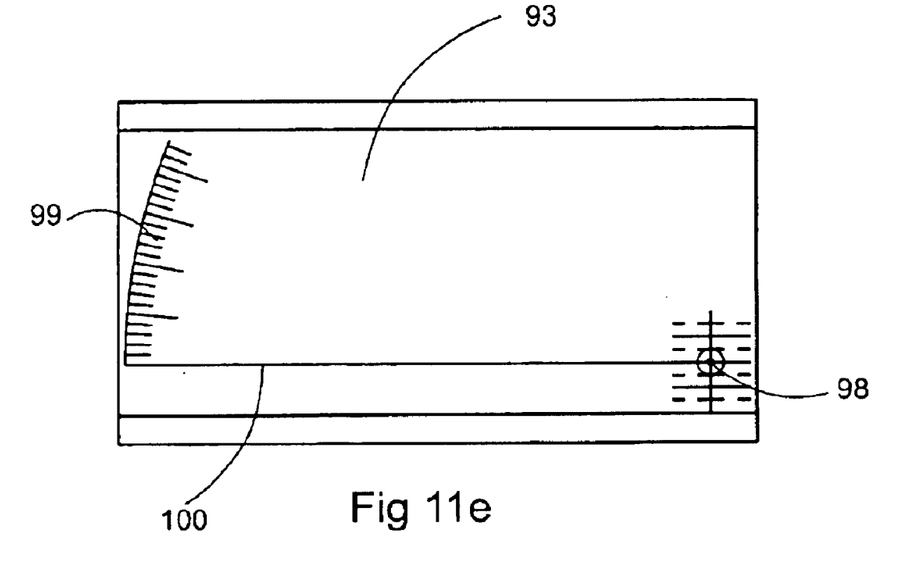
FIG. 11e is a front elevation of the embodiment of a target block as shown in FIG. 11a, being for use on the right side of the vehicle.
Figure 11F:
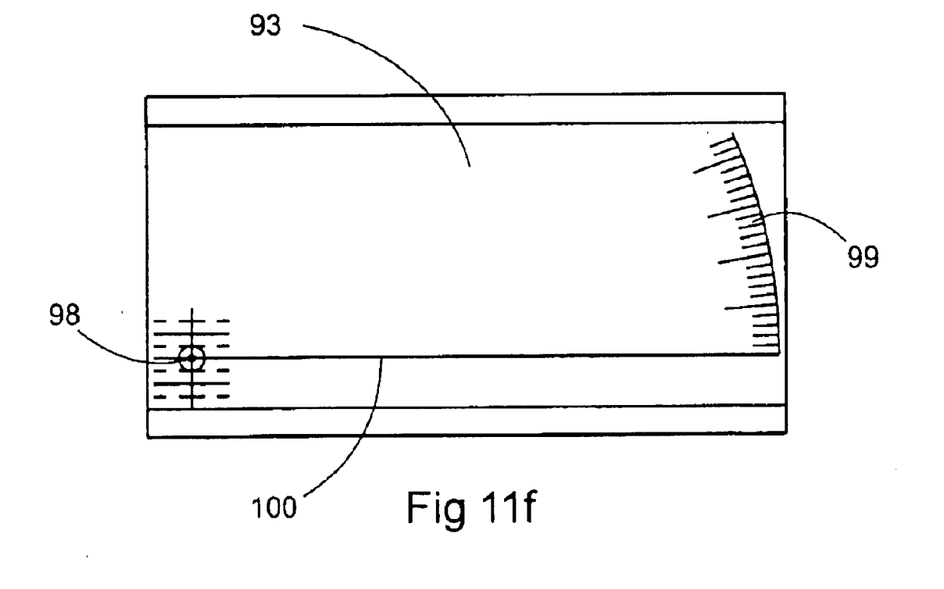
FIG. 11f is a front elevation of the embodiment of a target block as shown in FIG. 11a, being for use on the left side of the vehicle.
Figure 12A:
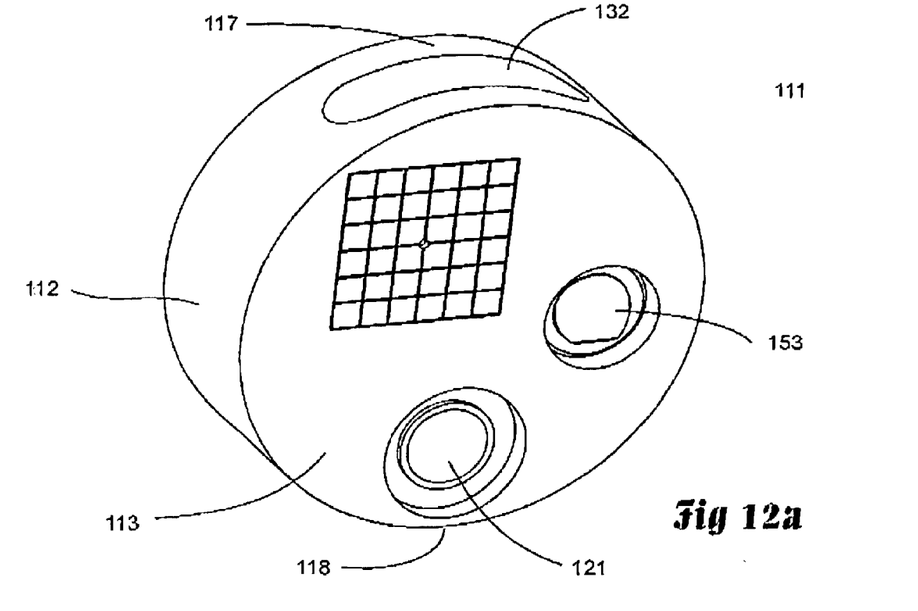
FIG. 12a is a front perspective view of a chassis alignment tool in accordance with the second embodiment.
Figure 12B:
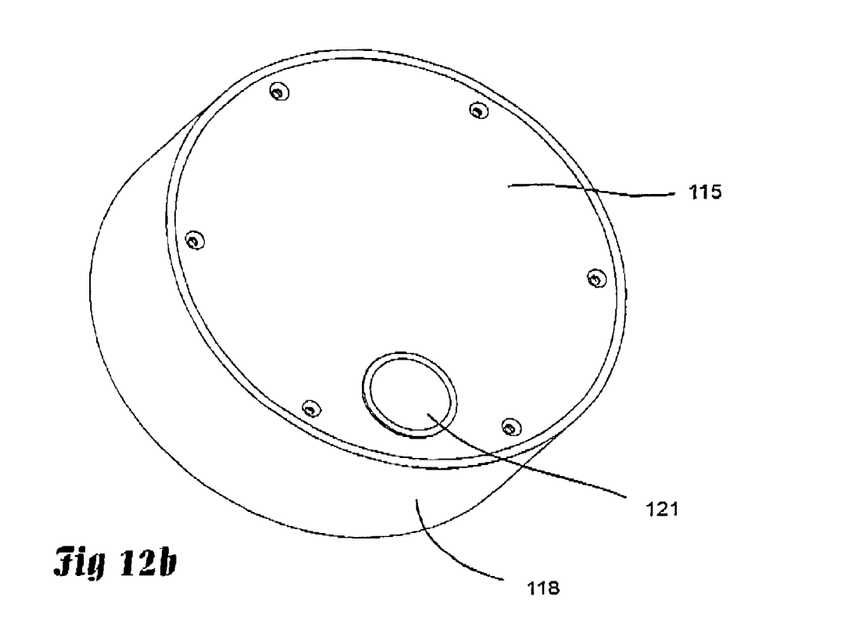
FIG. 12b is a rear perspective view of a chassis alignment tool in accordance with the second embodiment.
Figure 12C:
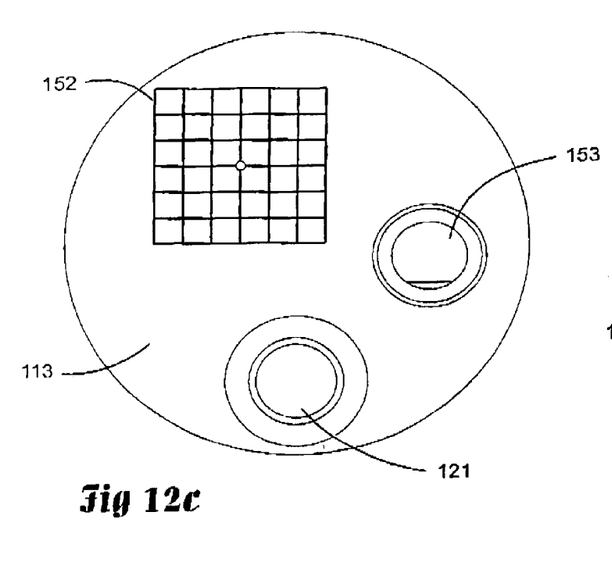
FIG. 12c is a front elevation of a chassis alignment tool in accordance with the second embodiment.
Figure 12D:
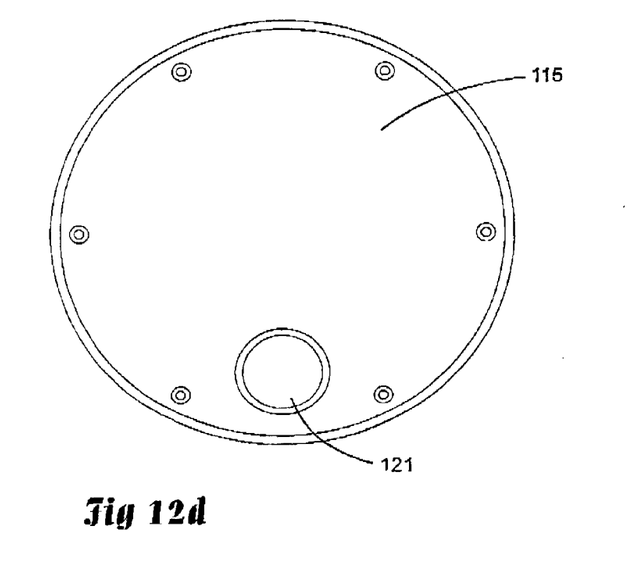
FIG. 12d is a rear elevation of a chassis alignment tool in accordance with the second embodiment.
Figure 12E:
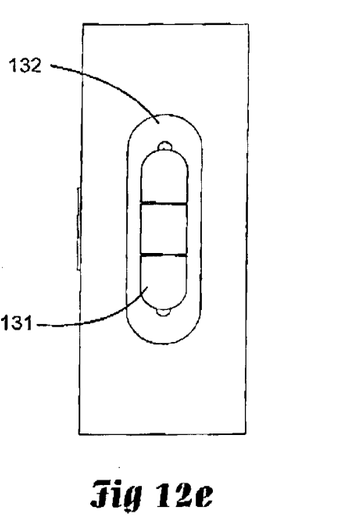
FIG. 12e is a plan view of a chassis alignment tool in accordance with the second embodiment.
Figure 12F:
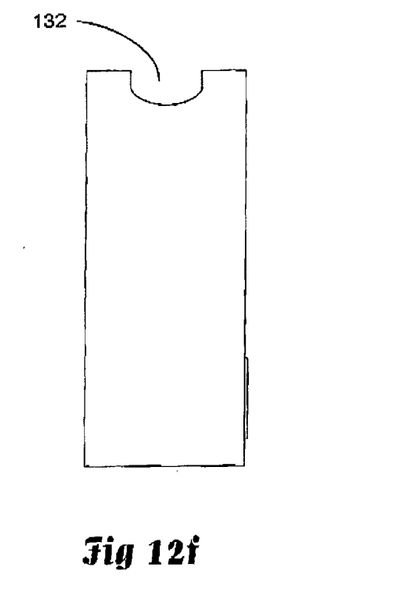
FIG. 12f is a side elevation of a chassis alignment tool in accordance with the second embodiment.
Figure 12G:
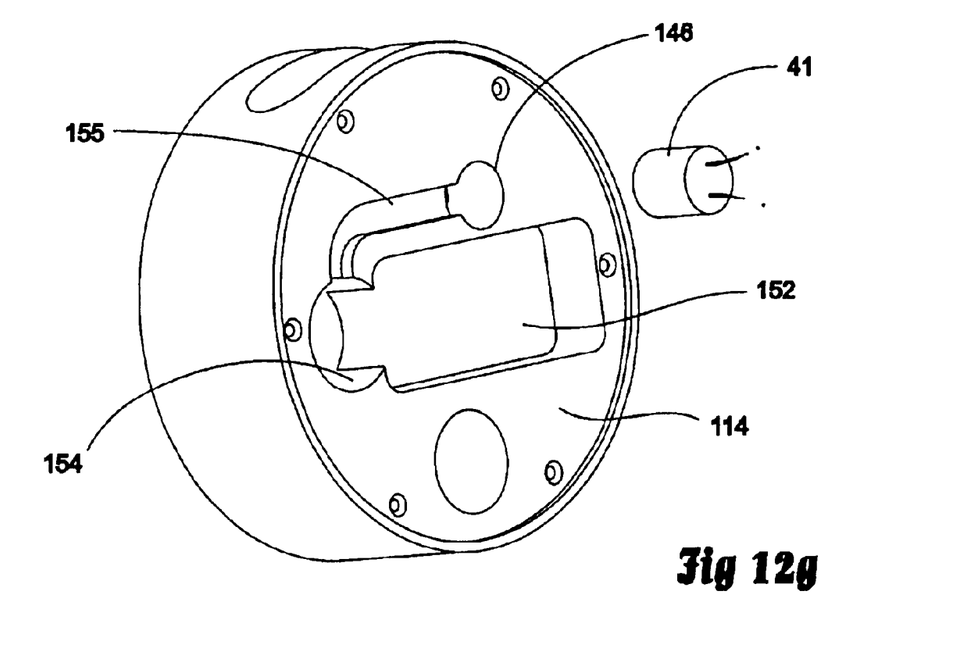
FIG. 12g is a rear perspective view of a chassis alignment tool having its rear cover removed in accordance with the second embodiment.
Figure 12H:
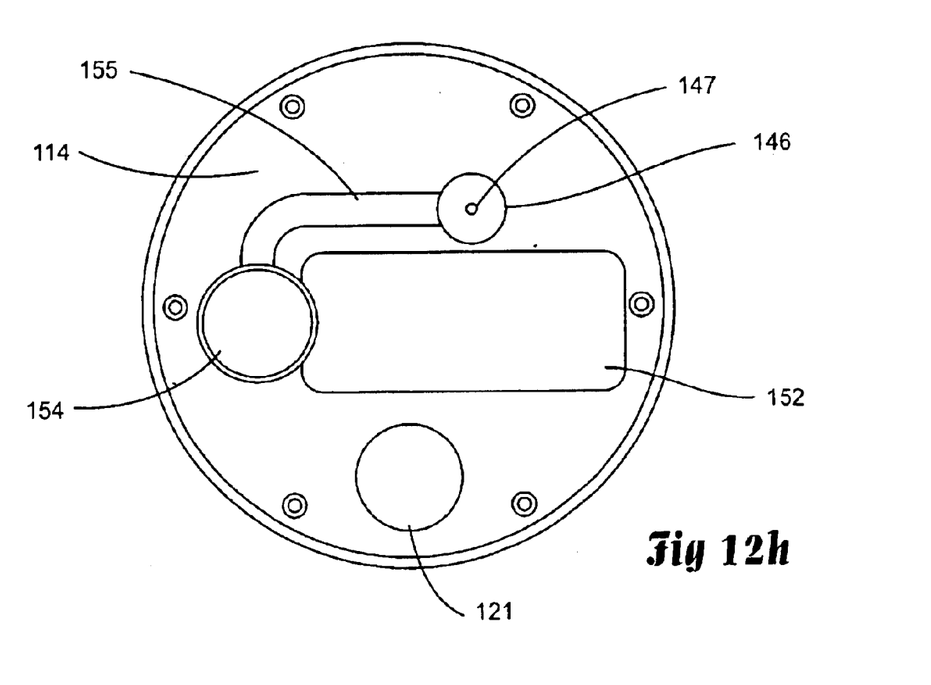
FIG. 12h is a rear elevation of a chassis alignment tool having its rear cover removed in accordance with the second embodiment.

The alignment tool according to the third embodiment may also be used to measure the king-pin inclination angle. To make this measurement, a target 91 as shown in FIGS. 11a to 11f is used. The target comprises a mounting block 92 having a gauge face 93, an opposed mounting face 94 and retaining means 95. The mounting face 94 of the embodiment of the target as shown in FIGS. 11a, 11b and 11d comprises a broad notch profile extending the length of the target block which is adapted to correspond with any suitable cylindrical support such as the rear axle. The retaining means 95 comprises a resiliently extensible strap attached at one end to the lower face of the target block and adapted to be clasped at the other end to the upper face 97 of the target block. The gauge face 93 has marked upon it a reference point 98, a reference line 100 extending from the reference point 98 and angular gradations 99 to indicate an angle relative to the reference line. The reference line is arrange parallel to the notch to thereby be oriented parallel to the cylindrical support, such as the rear axle.

In use, the target block 92 is mounted to the rear axle and engaged therewith by the engagement strap 95. It is necessary to properly align the orientation of the gauge face relative to the rearwardly directed beam of the respective alignment tool 11. With the vehicle substantially horizontal and the steering aimed in a straight-ahead direction, the target block is rotated about the rear axle and adjusted to be vertical, and positioned so that the rearwardly directed beam from the alignment tool strikes the reference point on the gauge plane 93. Some repetitive adjustments may be necessary to align the target block and the alignment tool with sufficient precision. When this alignment is completed, the steering is moved so that the dot from the rearwardly directed beam is moved from the reference point 98 on the gauge face 93 to the angular graduations 99. The angle indicated relative to the reference line 100 identifies a composite angle comprising the king-pin inclination angle and the camber angle.

In a further adaptation of the third embodiment, the rearwardly directed beam is oriented downwardly at a slight pre-determined angle relative to the horizontal. In this way the height of the target block may be reduced, as the beam is better aimed at the target block.

While a number of embodiments have been described, it should be appreciated that the scope of this invention is not limited to those particular embodiments and modifications and further embodiments are possible within the scope of the invention claimed.

The invention has been described with reference to a go-kart having a pair of steerable wheels at the front of the vehicle. However, it should be recognized that the invention may be equally applied to four-wheeled vehicles other than go-kart. The invention is applicable whether the steerable wheels are at the front or at the rear or indeed have both front and rear sets of wheels steerable.

Throughout the specification, unless the context requires otherwise, the word "comprise" or variations such as "comprises" or "comprising", will be understood to imply the inclusion of a stated integer or group of integers but not the exclusion of any other integer or group of integers.

I claim:

1. A chassis alignment system adapted for use in aligning the wheels of a vehicle having front wheels mounted upon opposed steerable stub-axles, each stub-axle having a central axis, the chassis alignment system comprising a pair of alignment tools, the alignment tools being receivable upon said stub-axles in opposed relation to each other in place of the wheels, each alignment tool comprising a rigid, unitary housing having a mounting receivable directly on the respective stub-axle, the mounting supporting the housing from the stub-axle in a fixed attitude with respect to the respective central axis, the housing being adjustable in position around the stub-axle, each housing accommodating a first laser emitter which in use will emit a beam in a direction parallel to the central axis of the respective stub-axle, each alignment tool further comprising a graduated target positioned in use to receive the beam from the first laser emitter of the other alignment tool, each target having a reference point located at a fixed position relative to the central axis of the respective stub-axle, wherein the point of incidence of each beam on the respective target relative to the reference point enables the determination of the orientation of the stub-axles with respect to each other.

2. A chassis alignment system as claimed at claim 1 wherein each graduated target is arranged to determine toe-in.

3. A chassis alignment system as claimed at claim 1 wherein each graduated target is arranged to determine camber.

4. A chassis alignment system as claimed at claim 1 wherein each of the mountings comprises an integral clamp.

5. A chassis alignment system as claimed at claim 1 wherein each mounting comprises an aperture integral with a respective one of said housings, each aperture adapted to be received by a respective one of said steerable stub-axles and be secured thereto.

6. A chassis alignment system as claimed at claim 1 wherein each alignment tool further comprises an orienting means adapted to enable the alignment tool to be oriented to a datum.

7. A chassis alignment system as claimed at claim 6 where the orienting means comprises a spirit level associated with a respective one of said housings to provide a reference for orienting the housing.

8. A chassis alignment system as claimed at claim 1 wherein the reference point is the point on the surface of each alignment tool at which the beam is emitted from that alignment tool.

9. A chassis alignment system as claimed at claim 1 wherein each alignment tool further comprises a second laser emitter, wherein, in use, the second laser emitter emits a second beam in a direction substantially transverse to that of the beam of the first laser emitter.

10. A chassis alignment system as claimed at claim 9 wherein each alignment tool is associated with a respective king-pin target which in use is mounted to the rear axle to intercept the second beam from second laser emitter of the respective alignment tool, each king-pin target comprising a reference point, an indication relative to a datum and a angular gauge indicating angular displacement from said indication about said reference point, the indication being parallel to the axis of said rear axle when mounted thereto.

11. A chassis alignment system as claimed at claim 10 wherein the king-pin target is adapted to be mounted to the rear axle of the vehicle, the indication being parallel to the axis of said rear axle when mounted thereto.

12. A chassis alignment system as claimed at claim 1 wherein a wheel may be positioned onto each of the stub-axles thereby enabling the determination of the orientation of the stub-axle to be made while the vehicle is supported from said wheels.

13. In combination, a pair of alignment tools and a castor gauge, each alignment tool comprising a housing having a mounting means adapted to enable the tool to be fixed to a respective steerable stub-axle and to be movable therewith, each laser emitting means being disposed in the respective housing at a predetermined distance from the mounting means, the mounting means being further adapted to enable the laser emitting means to be oriented about a central axis of the respective steerable stub-axle into a selected orientation, each laser beam being adapted to be emitted in a direction parallel to the respective central axis, the mounting means being further adapted to enable the laser emitting means to be oriented about the central axis of the first steerable stub-axle into a selected orientation, the castor gauge comprising a target having a target face, the target face having a reference point, an indication relative to a reference plane and an angular gauge indicating angular displacement from said indication about said reference point, wherein, in use, the castor gauge is mounted substantially mid-way between the alignment tools when mounted to the stub-axles, the target plane being substantially normal to the first beams emitted by each of said alignment tools.

14. A combination according to claim 13 wherein the castor gauge comprises a pair of parallel faces and the target face is one of said parallel faces.

15. A combination according to claim 14 wherein the material between the pair of parallel faces is substantially transparent or translucent.

16. A method of orienting the steering of a vehicle in a straight-ahead direction, the method comprising the steps of mounting relative to each of the steerable axles of the vehicle an alignment tool, each alignment tool comprising a housing having a mounting means adapted to enable the tool to be fixed to a respective steerable axle and to be movable therewith, each laser emitting means being disposed in the respective housing at a predetermined distance from the mounting means, the mounting means being further adapted to enable the laser emitting means to be oriented about the central axis of the respective steerable axle into a selected orientation, each laser beam being adapted to be emitted in a direction parallel to the respective central axis, co-aligning the alignment tools relative to each other, positioning a target at an equal distance between each of the alignment tools, the target comprising a pair of parallel faces having a reference point referable to each face, and positioning the target so that the beam from each alignment tool is incident upon a respective face at the position referable to said reference point, each beam being incident upon the respective face substantially normal to that face.

17. A method of measuring the castor angle of the steering geometry of a vehicle, the method comprising the steps of mounting relative to each of the steerable axles of the vehicle an alignment tool, each alignment tool comprising a housing having a mounting means adapted to enable the tool to be fixed to a respective steerable axle and to be movable therewith, each laser emitting means being disposed in the respective housing at a predetermined distance from the mounting means, the mounting means being further adapted to enable the laser emitting means to be oriented about the central axis of the respective steerable axle into a selected orientation, each laser beam being adapted to be emitted in a direction parallel to the respective central axis, co-aligning the alignment tools relative to each other, positioning the steering to a straight-ahead direction, positioning a castor gauge mid-way between the two alignment tools, the castor gauge comprising a reference point, an indication relative to a datum and a angular gauge indicating angular displacement from said indication about said reference point, orienting the castor gauge to align the indication parallel to the datum, and thereafter moving the steering to cause the beam from one alignment tool to be moved away from the reference towards the angular gauge to enable the angular displacement of the beam from the indication to be observed.

18. A method as claimed at claim 17 wherein the datum is adjusted to a horizontal reference and the orientation reference of the castor gauge is made relative to a horizontal reference plane.

19. A method as claimed at claim 18 wherein the horizontal reference plane is ascertained by reference to a vertical reference.

20. A chassis alignment tool for a vehicle having front wheels mounted upon opposed steerable stub-axles, each stub-axle having a central axis, the tool comprising a rigid, unitary housing having a mounting integral with the housing and directly receivable upon a one of said stub-axles, the mounting supporting the housing from the stub-axle in a fixed attitude with respect to the central axis of the stub-axle, the housing being adjustable in position around the stub-axle, the housing accommodating a first laser emitter which in use will emit a beam in a direction parallel to the central axis of the one stub-axle, the alignment tool further comprising a graduated target positioned in use to receive the beam from the first laser emitter of another alignment tool of the same type mounted to the other stub-axle, the target having a reference point located at a fixed position relative to the central axis of the one stub-axle, wherein the point of incidence of the beam from the other alignment tool on the target relative to the reference point enables the determination of the orientation of the stub-axles with respect to each other.

21. A chassis alignment tool as claimed at claim 20 wherein the mounting comprises a clamp integral with the housing.

22. A chassis alignment tool as claimed at claim 20 wherein the mounting means comprises an aperture integral with the housing, the aperture being receivable by the one stub-axle to be secured thereto.

23. A chassis alignment tool as claimed at claim 20 wherein the tool further comprises an orienting means adapted to enable the tool to be oriented to a specific orientation.

24. A chassis alignment tool as claimed at claim 23 where the orienting means comprises a spirit level associated with the housing to provide a reference for orienting the housing.

25. A chassis alignment tool as claimed at claim 20 wherein the chassis alignment tool further comprises a second laser emitter, the second laser emitting means being adapted to emit a second laser beam in a direction substantially transverse to that of the first laser beam.

26. A chassis alignment system adapted for use in aligning the wheels of a go-kart, the go-kart having front wheels mounted upon opposed, steerable stub-axles, each stub-axle having a central axis, the chassis alignment system comprising a pair of alignment tools, the alignment tools being receivable upon said stub-axles in opposed relation to each other in place of the wheels, each alignment tool comprising a rigid, unitary housing having a mounting receivable directly on the respective stub-axle, the mounting supporting the housing from the stub-axle in a fixed attitude with respect to the respective central axis, the housing being adjustable in position around the stub-axle, each housing accommodating a first laser emitter which in use will emit a beam in a direction parallel to the central axis of the respective stub-axle, each alignment tool further comprising a graduated target positioned in use to receive the beam from the first laser emitter of the other alignment tool, each target having a reference point located at a fixed position relative to the central axis of the respective stub-axle, wherein the point of incidence of each beam on the respective target relative to the reference point enables the determination of the orientation of the stub-axles with respect to each other.

* * * * *